US008332676B2

(12) United States Patent
Lyra et al.

(10) Patent No.: US 8,332,676 B2
(45) Date of Patent: Dec. 11, 2012

(54) METHODS OF PREPARING A POWER SAVING STATE, UNIVERSAL SERIAL BUS DEVICE AND UNIVERSAL SERIAL BUS HOST

(75) Inventors: Markus Lyra, Munich (DE); Andreas Bucher, Neuried (DE)

(73) Assignee: Intel Mobile Communications GmbH, Neubiberg (DE)

( * ) Notice: Subject to any disclaimer, the term of this patent is extended or adjusted under 35 U.S.C. 154(b) by 397 days.

(21) Appl. No.: 12/565,797

(22) Filed: Sep. 24, 2009

(65) Prior Publication Data

US 2011/0072284 A1    Mar. 24, 2011

(51) Int. Cl.
*G06F 1/32*    (2006.01)

(52) U.S. Cl. ......... 713/323; 713/300; 713/310; 713/320

(58) Field of Classification Search .................. 713/300, 713/310, 320, 323
See application file for complete search history.

(56) References Cited

U.S. PATENT DOCUMENTS

| 6,622,178 | B1 | 9/2003 | Burke et al. | |
| 7,103,788 | B1* | 9/2006 | Souza et al. | 713/323 |
| 7,660,938 | B1* | 2/2010 | Chow et al. | 710/313 |
| 2006/0015759 | A1* | 1/2006 | Sekine et al. | 713/300 |
| 2007/0005824 | A1* | 1/2007 | Howard | 710/18 |
| 2007/0238437 | A1 | 10/2007 | Jaakkola | |
| 2008/0028113 | A1* | 1/2008 | Guo et al. | 710/104 |
| 2009/0034492 | A1* | 2/2009 | Narasimhan | 370/338 |
| 2009/0199031 | A1* | 8/2009 | Zhang et al. | 713/323 |
| 2009/0216981 | A1* | 8/2009 | Diefenbaugh et al. | 711/163 |
| 2010/0306788 | A1* | 12/2010 | Lee et al. | 719/321 |

OTHER PUBLICATIONS

PC Driver Requirements Specification (XMM6180 USB PC Driver; Preliminary Product Requirements; Andreas Bucher; Revision 00.60; Communication Solution) Edition Oct. 7, 2008, pp. 1-25 Published by Infineon Technologies AG, 81726 Munich, Germany.
Universal Serial Bus Specification, Revision 2.0, Apr. 27, 2000; pp. 155 (7.1.7.6.2 Selective Suspend); pp. 156 (7.1.7.7 Resume); pp. 243 (9.1.1.6 suspended); pp. 294 (10.5.04.2 Power Control).

* cited by examiner

*Primary Examiner* — Vincent Tran

(57) ABSTRACT

Methods of preparing a power saving state, a Universal Serial Bus (USB) device and a USB host are provided. A method of preparing a power saving state comprises sending a request from a USB device to a USB host, the USB host being connected to the USB device via a USB and the request requesting that the USB host shall stop any bus traffic on the USB. Another method of preparing a power saving state comprises receiving, at a USB host, a request from a USB device, the USB device being connected to the USB host via a USB and the request requesting that the USB host shall stop any bus traffic on the USB. A USB device and a USB host are configured to carry out the respective methods.

19 Claims, 5 Drawing Sheets

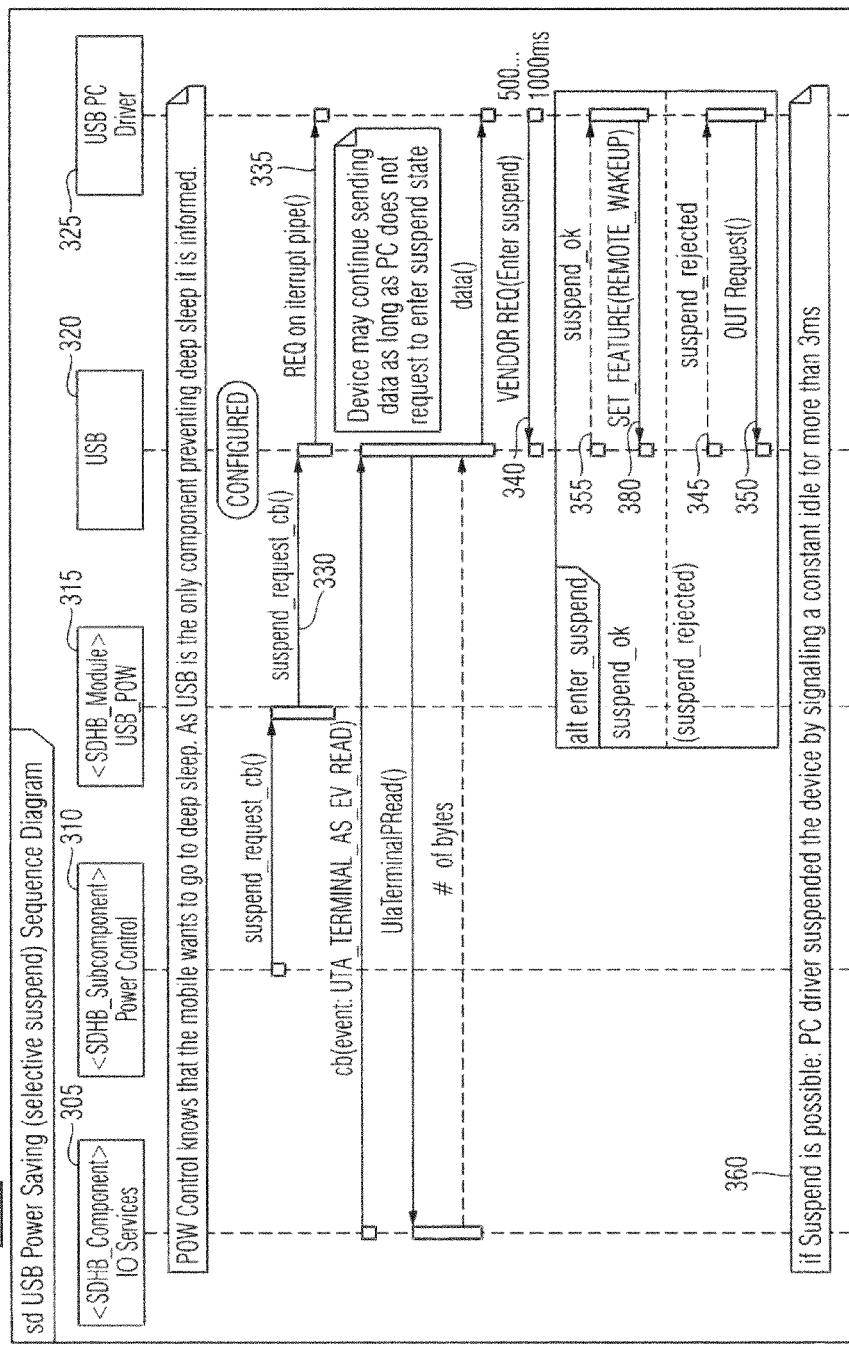

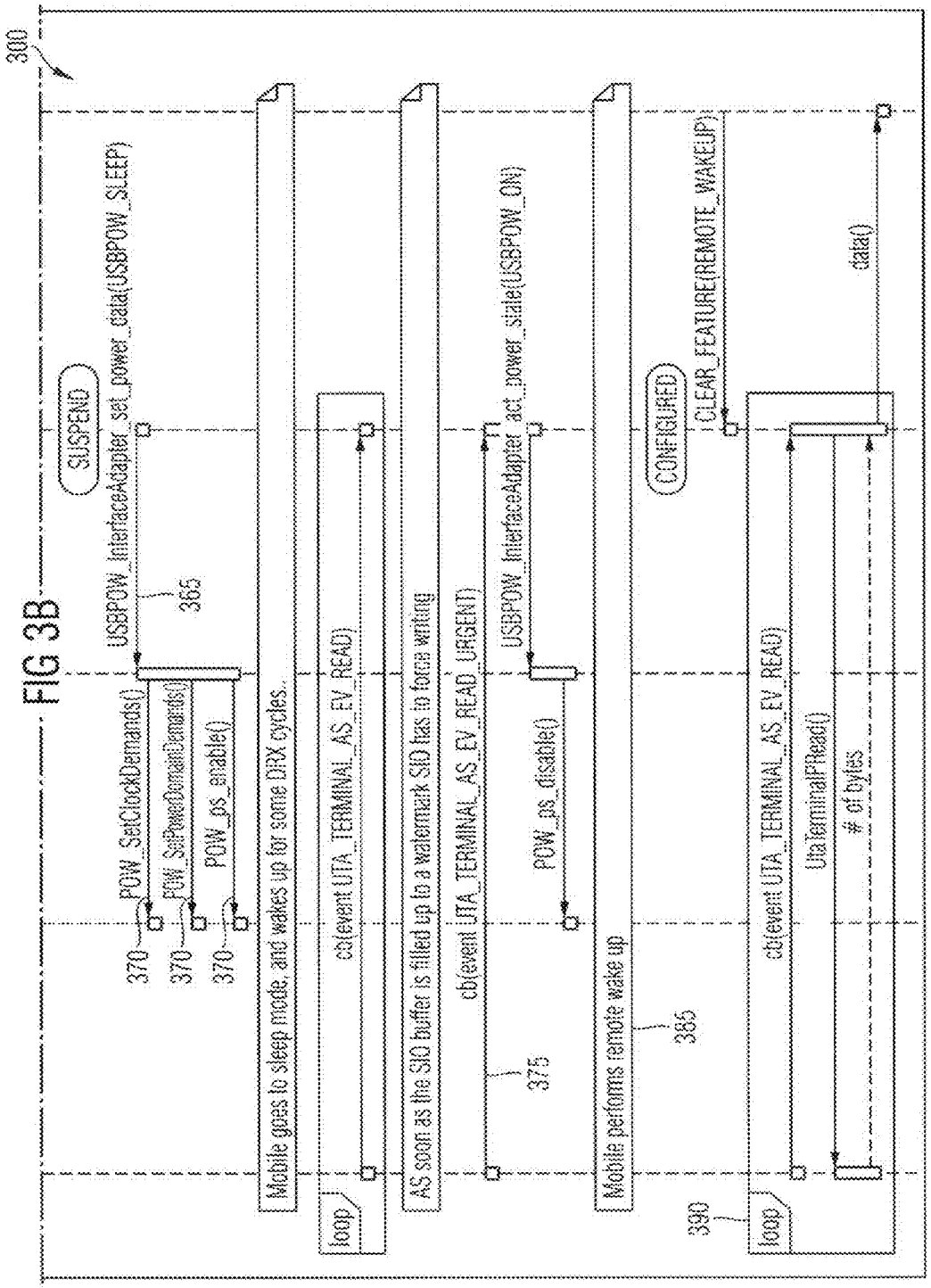

METHODS OF PREPARING A POWER SAVING STATE, UNIVERSAL SERIAL BUS DEVICE AND UNIVERSAL SERIAL BUS HOST

TECHNICAL FIELD

Embodiments of the invention relate generally to methods of preparing a power saving state, to a Universal Serial Bus (USB) device and to a USB host.

BRIEF DESCRIPTION OF THE SEVERAL VIEWS OF THE DRAWINGS

FIG. 3 (FIG. 3A, FIG. 3B) shows a sequence diagram in accordance with embodiments of the invention.

In the drawings, like reference characters generally refer to the same parts throughout the different views. The drawings are not necessarily to scale, emphasis instead generally being placed upon illustrating the principles of the invention.

DETAILED DESCRIPTION OF THE INVENTION

The following detailed description explains exemplary embodiments of the present invention. Where applicable the description of a method embodiment is deemed to describe also the functioning of a corresponding apparatus embodiment and vice versa. The description is not to be taken in a limiting sense, but is made only for the purpose of illustrating the general principles of the invention. The scope of the invention, however, is only defined by the claims and is not intended to be limited by the exemplary embodiments described below.

Figure 1:
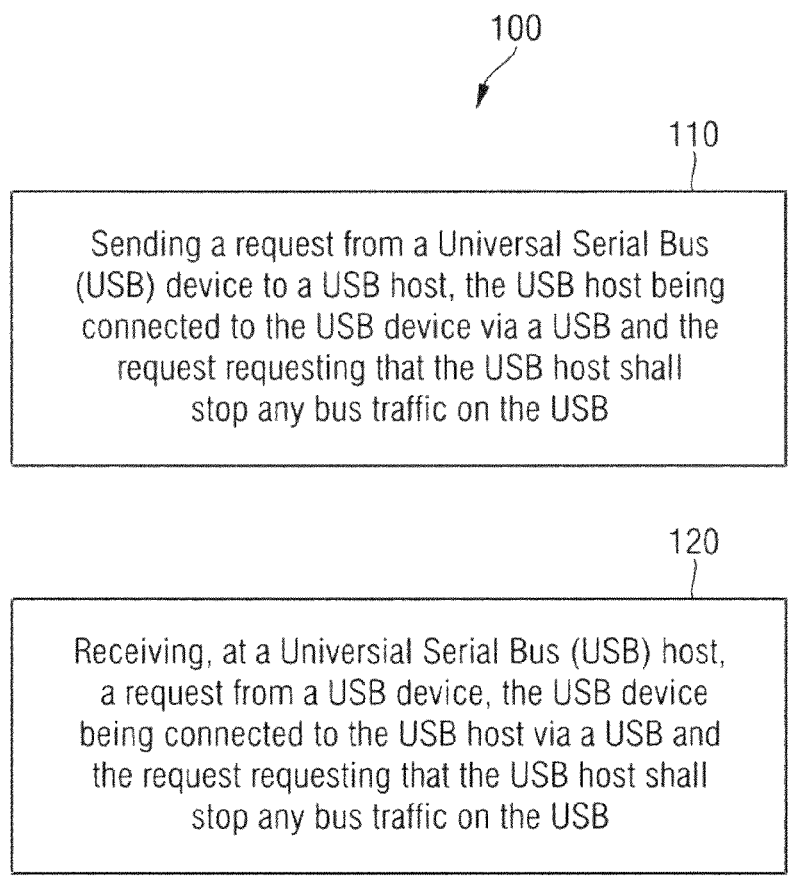
FIG. 1 shows a method of preparing a power saving state and another method of preparing a power saving state in accordance with embodiments of the invention in a combined flow diagram.

In FIG. 1 a method of preparing a power saving state and another method of preparing a power saving state in accordance with embodiments of the invention are shown in a combined flow diagram 100.

At 110, a method of preparing a power saving state includes sending a request from a Universal Serial Bus (USB) device to a USB host, the USB host being connected to the USB device via a USB and the request requesting that the USB host shall stop any bus traffic on the USB.

At 120, another method of preparing a power saving state includes receiving, at a Universal Serial Bus (USB) host, a request from a USB device, the USB device being connected to the USB host via a USB and the request requesting that the USB host shall stop any bus traffic on the USB.

Figure 2:
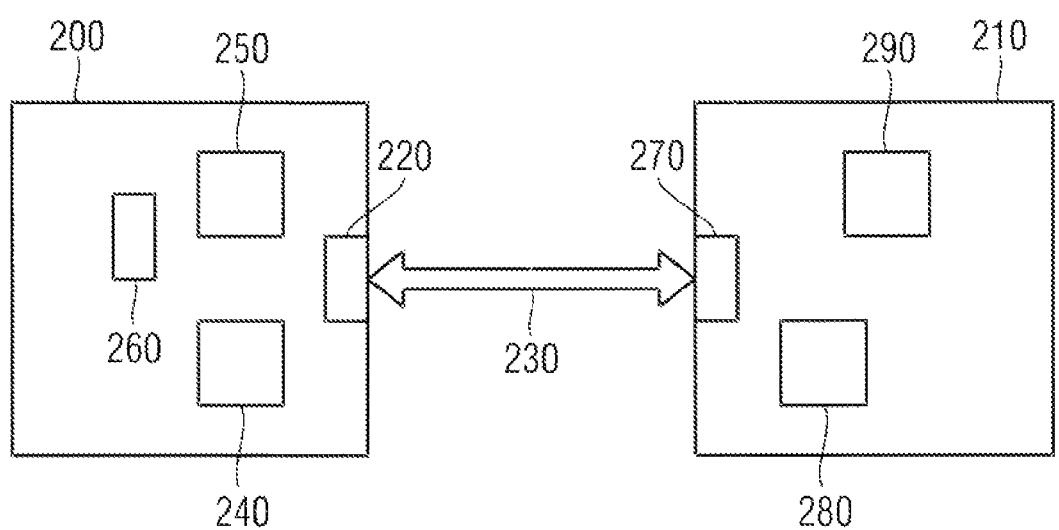
FIG. 2 shows a USB device and a USB host in accordance with embodiments of the invention in a combined diagram.

In FIG. 2 a USB device 200 and a USB host 210 in accordance with embodiments of the invention are shown in a combined diagram.

According to an embodiment of the invention the USB device 200 includes a USB device interface 220 configured to connect the USB device 200 to the USB host 210 via a USB 230 and includes a device send unit 240 to send a request to the USB host 210, the request requesting that the USB host 210 shall stop any bus traffic on the USB 230.

In an embodiment the USB device 200 further includes a device receive unit 250 configured to receive a message from the USB host 210, the message requesting that the USB device 200 shall stop sending data on the USB 230.

In an embodiment the device send unit 240 is further configured to send an acknowledgement to the USB host 210, the acknowledgement acknowledging that the USB device 200 will stop sending data on the USB 230.

In an embodiment the USB device 200 further includes a buffer memory 260 configured to collect data while the USB device 200 is in a suspended state, the data to be transmitted from the USB device 200 to the USB host 210 via the USB 230.

In an embodiment the device receive unit 250 is further configured to receive a configuration message from the USB host 210, the configuration message configuring the USB device 200 to be able to wake up the USB host 210 from a suspended state.

According to an embodiment of the invention the USB host 210 includes a USB host interface 270 to connect the USB host 210 to the USB device 200 via the USB 230 and includes a host receive unit 280 to receive a request from the USB device 200, the request requesting that the USB host 210 shall stop any bus traffic on the USB 230.

In an embodiment the USB host 210 further includes a host send unit 290 to send a message to the USB device 200, the message requesting that the USB device 200 shall stop sending data on the USB 230.

In an embodiment the host receive unit 280 is further configured to receive an acknowledgement from the USB device 200, the acknowledgement acknowledging that the USB device 200 will stop sending data on the USB 230.

In an embodiment the host send unit 290 is further configured to send a configuration message to the USB device 200, the configuration message configuring the USB device 200 to be able to wake up the USB host 210 from a suspended state.

In FIG. 3 a sequence diagram 300 in accordance with embodiments of the invention is shown. FIG. 3 refers to both FIG. 3A and FIG. 3B. For proper presentation the view of the sequence diagram 300 is divided horizontally into an upper part (shown in FIG. 3A) and a lower part (shown in FIG. 3B). The sequence diagram 300 shows events, messages and commands to illustrate preparing a power saving state, entering a power saving state and leaving a power saving state of a USB device which is connected to a USB host via a USB connection.

When a USB device is connected to a USB Host, the USB link is active and draws current as the USB core cannot be powered down during an active connection—this is only possible while being in suspended state. The USB standard foresees the possibility to suspend the device if it is not used in order to reduce the power consumption. However, it is always the Host's decision if and when the device should be suspended. Therefore the USB Selective Suspend feature is usually used for devices entirely controlled by the Host like scanners or printers (printing and scanning is always started by the Host), but it is not suitable for mobile devices (phones, modems, data cards), which can continuously receive new data and forward it to the Host. In this case the Host cannot predict when the USB link will be no longer necessary and therefore it cannot suspend the device.

Up to now the USB Selective Suspend was not used for modems and the USB link was powered up all the time. There was no possibility to enter a power save state on a mobile device while being connected to a Host via USB. This results in increased power consumption of the mobile device (which is important since not all devices are designed to charge from USB, so the device battery will get depleted) and in increased power consumption of the host (which is relevant especially if the host is a laptop computer also running on batteries).

According to the USB standard specification, Universal Serial Bus Specification, Revision 2.0, Apr. 27, 2000, a device enters suspend state if the device observes no bus traffic for a specified period. The Host is the master—so it is controlling all the bus traffic, i.e. it triggers a transition to suspend state by stopping the bus traffic.

According to an embodiment of the invention the USB Device is given the possibility to contribute to the decision of the USB Host to trigger a transition to suspend state by stopping the bus traffic.

According to an embodiment of the invention the USB Device can request from the Host to stop the bus traffic in order to enter USB Selective Suspend.

In the example illustrated in FIG. 3 the USB device is a mobile phone and the USB host is a personal computer (PC). Both are connected via a USB cable. In the sequence diagram 300 the mobile phone is represented by its components "IO Services" (at Infineon Technologies AG also called "SIO") 305, "Power Control" 310, "USB_POW" (USB Power Control component) 315 and "USB" (USB component) 320. The PC is represented by its component "USB PC Driver" (PC) 325.

The selective suspend is triggered by the mobile device as it knows the time for entering power saving mode. While being in idle mode the mobile platform (mobile phone) may enter sleep mode—it only has to wake up once for paging during the DRX (discontinous reception) cycle.

It is assumed that the mobile device (mobile phone) is ready for going to deep sleep mode. The USB stack has registered a callback function with the USB_POW driver to get informed on the request of the "Power Control" driver to enter sleep mode. In case problems occur or are expected with other class drivers that may prevent entering the SUSPEND state it might be useful to apply the Selective Suspend feature only in the CDC (communication device class)-ACM (abstract control model) only configuration.

At 330, the USB component 320 is triggered by the "Power Control" component 310 to request selective suspend from the PC 325.

At 335, the USB component 320 requests selective suspend from the PC 325. This is an example for sending a request from a Universal Serial Bus (USB) device to a USB host, the USB host being connected to the USB device via a USB and the request requesting that the USB host shall stop any bus traffic on the USB.

At 335, furthermore, the PC 325 receives the request for selective suspend from the USB component 320. This is an example for receiving, at a Universal Serial Bus (USB) host, a request from a USB device, the USB device being connected to the USB host via a USB and the request requesting that the USB host shall stop any bus traffic on the USB.

At 340, after having been triggered from the mobile device, the PC USB Multi Interface driver (PC 325) requests the CDC-ACM Driver (USB component 320) to stop sending data.

Here are two scenarios possible:

(1) If the TX (transmit) buffer of the CDC-ACM driver needs to be cleared, the USB component 320 will, at 345, reject the suspend request (request to stop sending data). At 350, one or more OUT requests may be sent to the mobile device. Sending the trigger for entering SUSPEND state, at 335, has to be retried.

(2) If the CDC-ACM driver has no data to send, the USB component 320 will, at 355, acknowledge the SUSPEND request (request to stop sending data) and will stop sending SOFs (start of frame) in order to enable the mobile device USB HW to enter the SUSPEND state.

At 360, the PC 325 suspends the mobile device by stopping the bus traffic. At 365, the USB stack accordingly informs the Driver Wrapper to allow sleep mode.

Entering the SUSPEND state on the mobile device will be signaled, at 370, towards Power Control 310 to enable power saving functionality, i.e. to switch off USB related voltage domains and clocks.

As the cycle time for USB suspend/resume is quite long compared to the DRX cycle time, the USB component 320 will not be woken up for multiple DRX cycles. Low-priority data (like software trace) can be buffered within SIO 305. This goes on until the buffer reaches a watermark (predetermined filling level). At 375, SIO 305 forces a write operation that wakes up USB 320. This is an example for collecting data, the data to be transmitted from the USB device to the USB host via the USB, in a buffer memory while the USB device is in the suspended state; and waking up the USB device from the suspended state if a predetermined filling level of the buffer memory is reached.

Before the PC 325 can send data again (i.e. resume bus traffic), it has to wake-up the mobile phone (USB 320). This is achieved by driving the RESUME signal by the PC (as described in the USB standard specification).

The same applies vice versa for the mobile phone (USB 320). It will be able to wake up the host from SUSPEND state by means of REMOTE WAKEUP (reported in its Configuration Descriptor). For that purpose the PC 325 sets or activates, at 380, the feature REMOTE WAKEUP in the USB component 320. This is an example for sending, after the receiving a request, a configuration message to the USB device, the configuration message configuring the USB device to be able to wake up the USB host from a suspended state. At 385, the mobile phone performs remote wakeup of the PC 325. This is an example for waking up, after the receiving a configuration message, the USB host from a suspended state.

Resume signaling is used by the host (PC 325) or a device (USB component 320) to bring a suspended bus segment back to the active condition.

After the USB connection is configured (or "active") again, any low-priority data (e.g. trace data) buffered in SIO 305 will be sent, at 390, to the PC 325. After that USB 320 is ready to go to sleep mode again if requested by USB_POW 315.

The Device-Triggered USB Selective Suspend as described in this application introduces an additional vendor specific interface between the USB Device and the USB Driver on the Host. This interface is used by the USB Device to inform the Host when it can start the USB Selective Suspend procedure.

Usage examples include the following:

(1) Modem (mobile phone) connected via USB: If during packet switched connection (active PDCP-context) the data traffic is low, UTRAN (Universal Mobile Telecommunications System Terrestrial Radio Access Network) can decide to change the UE (user equipment) state (URRC state, user equipment radio resource control state) to Cell_PCH or URA_PCH. In this state UE could periodically go into sleep mode and wake up only for measurements and paging occasions. However, full power saving can be only achieved if also the USB link is suspended. With the new interface the USB device can now trigger the Host to activate the Selective Suspend on change in Cell_PCH/URA_PCH, which in turn reduces the power consumption.

(2) A USB device is configured to continuously send unsolicited AT-responses, therefore the USB host cannot suspend the link. With the new interface the USB device might inform the USB host when such responses are not expected and selective suspend could be activated.

(3) Software development: When tracing software execution over USB, a mobile device (mobile phone, modem) without the new interface would never enter power saving state when USB is connected. Therefore testing and tracing of power saving related software issues would not be possible. With the new interface the phone part of the device can be periodically suspended and waked up only for DRX cycles while the USB connection still remains suspended. A DRX cycle is typically quite short compared to the time required for a USB suspend/resume cycle. Traces generated during this state can be buffered on the device. When the trace buffer gets full, USB selective suspend mode can be left and the collected traces can be sent to the host.

Figure 4:
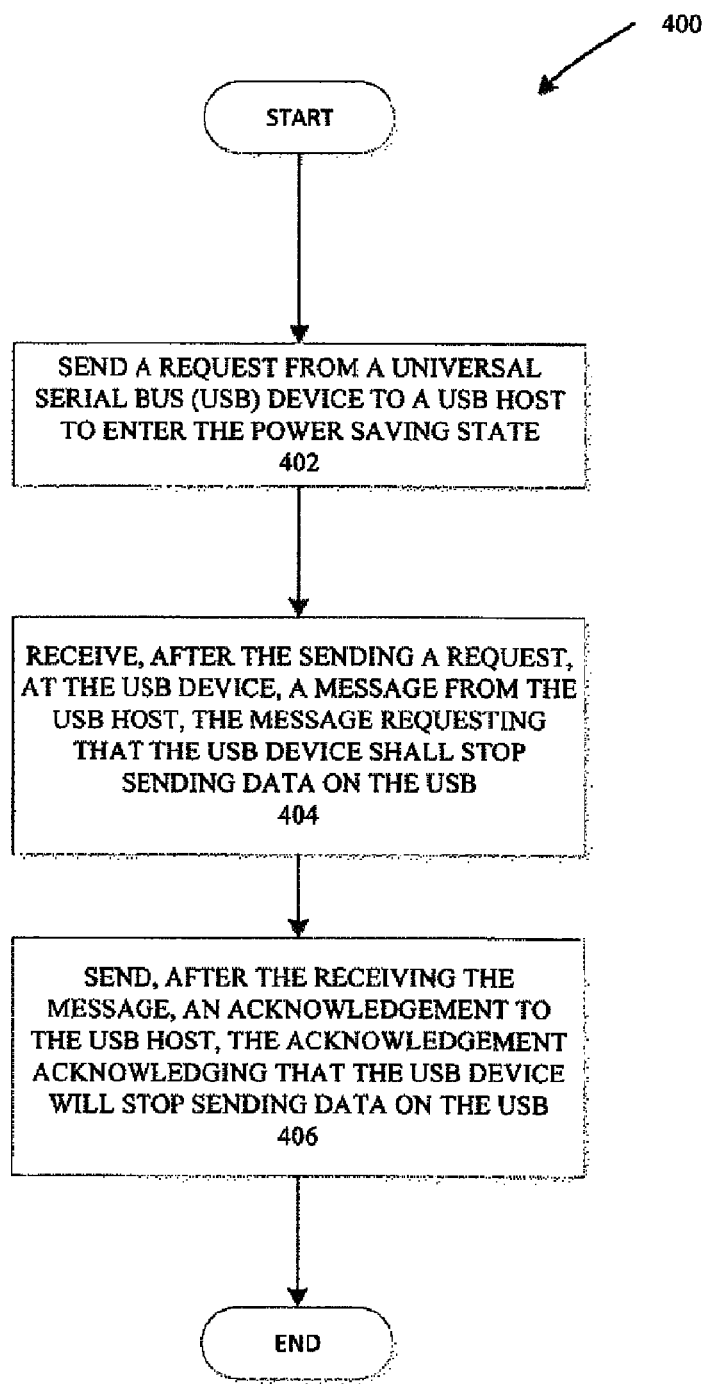
FIG. 4 shows a flowchart of a process for preparing a power saving state in accordance with and aspect of this disclosure.

FIG. 4 shows a flowchart of a process for preparing a power saving state in accordance with and aspect of this disclosure. Process 400 begins with sending a request from a Universal Serial Bus (USB) device to a USB host to enter the power saving state (step 402).

Then, process 400 receives, after the sending a request, at the USB device, a message from the USB host, the message requesting that the USB device shall stop sending data on the USB (step 404). Next, process 400 sends, after the receiving the message, an acknowledgement to the USB host, the acknowledgement acknowledging that the USB device wilt stop sending data on the USB (step 406).

According to an embodiment of the invention, any embodiment defined by one of the claims may be combined with any one or more other embodiments defined by respective one or more of the other claims.

The invention claimed is:

1. A method of preparing a power saving state, comprising:
sending a request from a Universal Serial Bus (USB) device to a USB host, the USB host being connected to the USB device via a USB and the request requesting that the USB host shall stop any bus traffic on the USB;
entering a suspended state of the USB device; and
collected data, the data to be transmitted from the USB device to the USB host via the USB, in a buffer memory while the USB device is in the suspended state; and
waking up the USB device from the suspended state if a predetermined filling level of the buffer memory is reached.

2. The method as recited in claim 1, further comprising:
receiving, after the sending a request, at the USB device, a message from the USB host, the message requesting that the USB device shall stop sending data on the USB.

3. The method as recited in claim 2, further comprising:
sending, after the receiving the message, an acknowledgement to the USB host, the acknowledgement acknowledging that the USB device will stop sending data on the USB.

4. The method as recited in claim 1, further comprising:
receiving, after the sending a request, at the USB device a configuration message from the USB host, the configuration message configuring the USB device to be able to wake up the USB host from a suspended state.

5. The method as recited in claim 4, further comprising:
waking up, after the receiving a configuration message, the USB host from a suspended state.

6. A method of preparing a power saving state, comprising:
receiving, at a Universal Serial Bus (USB) host, a request from a USB device, the USB device being connected to the USB host via a USB and the request requesting that the USB host shall stop any bus traffic on the USB;
collecting data, the data to be transmitted from the USB device to the USB host via the USB, in a buffer memory while the USB device is in a suspended state, wherein the USB device is in a suspended state; and
waking up the USB device from the suspended state if a predetermined filling level of the buffer memory is reached.

7. The method as recited in claim 6, further comprising:
sending, after the receiving a request, a message to the USB device, the message requesting that the USB device shall stop sending data on the USB.

8. The method as recited in claim 7, further comprising:
receiving, after the sending the message, at the USB host an acknowledgement from the USB device, the acknowledgement acknowledging that the USB device will stop sending data on the USB.

9. The method as recited in claim 6, further comprising:
sending, after the receiving a request, a configuration message to the USB device, the configuration message configuring the USB device to be able to wake up the USB host from a suspended state.

10. The method as recited in claim 6, further comprising:
stopping, after the receiving a request, any bus traffic on the USB.

11. A Universal Serial Bus (USB) device, comprising:
a USB device interface to connect the USB device to a USB host via a USB; and
a device send unit to send a request to the USB host, the request requesting that the USB host shall stop any bus traffic on the USB; the USB device configured to enter a suspended state; and the USB device configured to be woken up from the suspended state if a redetermined filling level of a buffer memory is reached; and
the buffer memory for collecting data, the data to be transmitted from the USB device to the USB host via the USB, in the buffer memory while the USB device is in the suspended state.

12. The USB device as recited in claim 11, further comprising:
a device receive unit to receive a message from the USB host, the message requesting that the USB device shall stop sending data on the USB.

13. The USB device as recited in claim 12, the device receive unit further to receive a configuration message from the USB host, the configuration message configuring the USB device to be able to wake up the USB host from a suspended state.

14. The USB device as recited in claim 11, the device send unit further to send an acknowledgement to the USB host, the acknowledgement acknowledging that the USB device will stop sending data on the USB.

15. The USB device as recited in claim 11, further comprising:
a buffer memory to collect data while the USB device is in a suspended state, the data to be transmitted from the USB device to the USB host via the USB.

16. A Universal Serial Bus (USB) host, comprising:
a USB host interface to connect the USB host to a USB device via a USB; and
a host receive unit to receive a request from the USB device, the request requesting that the USB host shall stop any bus traffic on the USB, wherein the USB device collects data, the data to be transmitted from the USB device to the USB host via the USB, in a buffer memory while the USB device is in a suspended state, wherein the USB device is in a suspended state; and waking up the USB device from the suspended state if a predetermined filling level of the buffer memory is reached.

17. The USB host as recited in claim 16, further comprising:
a host send unit to send a message to the USB device, the message requesting that the USB device shall stop sending data on the USB.

18. The USB host as recited in claim 17, the host send unit further to send a configuration message to the USB device, the configuration message configuring the USB device to be able to wake up the USB host from a suspended state.

19. The USB host as recited in claim 16, the host receive unit further to receive an acknowledgement from the USB device, the acknowledgement acknowledging that the USB device will stop sending data on the USB.

* * * * *